United States Patent [19]
Lemelson

[11] 3,788,500
[45] Jan. 29, 1974

[54] AUTOMATIC TRANSFER AND TRANSPORT SYSTEM

[76] Inventor: Jerome H. Lemelson, 85 Rector St., Metuchen, N.J. 08840

[22] Filed: Apr. 27, 1971

[21] Appl. No.: 137,992

Related U.S. Application Data

[63] Continuation-in-part of Ser. No. 806,501, March 12, 1969, abandoned.

[52] U.S. Cl.......... 214/41, 214/38 BB, 214/38 CA, 214/517
[51] Int. Cl............................................ B65g 67/04
[58] Field of Search...... 214/14, 38 R, 38 B, 38 BA, 214/38 BB, 38 CA, 38 CC, 38 D, 41, 516, 517, 16.4, 16.4 A

[56] References Cited
UNITED STATES PATENTS

| | | | |
|---|---|---|---|
| 2,441,367 | 5/1948 | Noville | 214/38 CA X |
| 3,049,247 | 8/1962 | Lemelson | 214/16.4 A |
| 2,096,958 | 10/1937 | Clerc | 214/38 D X |
| 2,514,752 | 7/1950 | Faulkner et al | 214/38 D X |
| 1,341,996 | 1/1920 | Plucienski | 214/38 CA X |
| 2,575,565 | 11/1951 | Schwalbe | 214/38 CA X |
| 2,715,969 | 8/1955 | Olsen | 214/14 X |
| 3,027,023 | 3/1962 | McGrath | 214/38 D X |
| 2,988,237 | 6/1961 | De Vol | 214/16.4 |
| 3,397,802 | 8/1968 | Hinchee | 214/38 D |

Primary Examiner—Robert G. Sheridan

[57] ABSTRACT

An apparatus and system for automatically loading and unloading vehicles such as truck and trailer bodies, cargo aircraft, trains, boats and the like utilizing computer-controlled stacker cranes and specialized guidance means therefore to effect the direct or indirect transfer of palletized cargo to and from a loading ramp or ramp system and one or more vehicles which are prepositioned relative thereto.

In one form, a track system such as an overhead monorail trackway for guiding stacker cranes is provided to carry loads from temporary storage in racking located near or at a loading ramp to vehicles predeterminately disposed with respect to said ramp. Upon predeterminately aligning a vehicle with the ramp and crane trackway, one or more stacker cranes may be operated to automatically load and/or unload the vehicle by traveling adjacent thereto or into the vehicle.

In another form, modular racks are provided which are portable and may be automatically winched or otherwise moved from the loading ramp into the vehicle in the act of loading the vehicle or from the vehicle onto the loading ramp when unloading the vehicle of a plurality of such portable racks.

Either the vehicle or a trackway may be moved to effect the movement of a materials handling device from the loading ramp into the vehicle and, in the act of unloading the vehicle from the vehicle onto the loading ramp. Means are provided in the vehicle for retaining loads or racks predeterminately disposed therein so as to prevent their shifting during movement of the vehicle.

5 Claims, 6 Drawing Figures

PATENTED JAN 29 1974

INVENTOR.
JEROME H. LEMELSON

INVENTOR.
JEROME H. LEMELSON 3,788,500

AUTOMATIC TRANSFER AND TRANSPORT SYSTEM

RELATED APPLICATIONS

This is a continuation-in-part of Ser. No. 806,501 filed Mar. 12, 1969, now abandoned, for an Automatic Transfer and Transport System.

SUMMARY OF THE INVENTION

This invention relates to a system and apparatus for automatically loading and unloading vehicles with cargo which is preferably contained on pallets, racks or in special containers to permit the cargo to be easily transported to distant locations such as between terminals, cities or countries. Heretofore the loading of cargo in trucks, trains, aircraft and boats has involved either manually disposing cartons therein or the employment of lift trucks and manually controlled cranes to effect the transfer of the cargo both to and from the vehicle. The instant invention is concerned with a system and apparatus which may be operated automatically, and in certain instances under computer control, for transferring loads and cargoes from a storage area such as an automatic warehouse of the type defined in my U.S. Pat. No. 3,049,247, or from a temporary storage area to selected cargo carriers which are respectively prepositioned for the performance of such automatic loading operations at a loading terminal. The loating terminal which may contain a plurality of loading locations for a plurality of vehicles or ships to be simultaneously loaded or for the performance of both loading and unloading operations simultaneously, may contain a plurality of branch conveyors or trackways extending from one or more similar conveyors or trackways which extend to the automatic warehouse system or storage rack area for the terminal thus permitting one or more carriers to travel therealong to selected vehicles located at the terminal and to selected locations of the warehouse or storage racking to either unload or load same. While the carriers defined herein are illustrated as respective automatic stacker cranes of the type defined in Pat. No. 3,049,247, they may also comprise other forms of self propelled carriers or combinations of conveyors such as carriers and belt conveyors may be employed.

Special means are also provided for supporting a conveyor or trackway for a loading and unloading device within a vehicle which is predeterminately disposed with respect to a loading ramp.

It is a primary object of this invention to provide a new and improved article transport system and method for transferring loads or articles between storage terminals.

Another object is to provide an improved apparatus and method for automatically loading and unloading vehicles without the need for human attendance by applying computerized vehicle loading control techniques.

Another object is to provide a freight system wherein cargo may be automatically loaded and unloaded from vehicles by conveying means including a guideway terminating an automatic conveying system, said guideway either being insertable into the vehicle from a loading ramp or secured to the vehicle.

Another object is to provide a transport system for loads wherein automatic transfer devices operate both exterior of and within a vehicle and guided on a track or conveyor which is permanently part of the vehicle.

Another object is to provide an automatic apparatus for loading and unloading lightweight structures such as aircraft bodies.

Another object is to provide an apparatus for automatically loading and unloading freight cars without manual attendance.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 4' shows an electrical coupling means applicable to trackways disposed within the vehicles;

Figure 1:
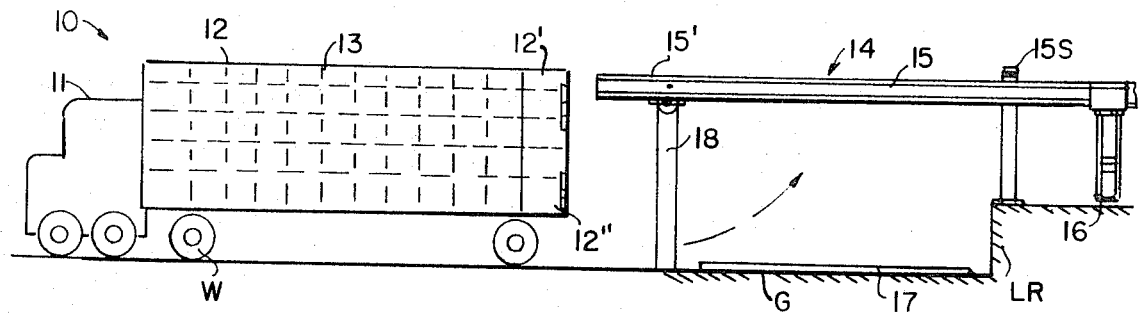
FIG. 1 is a side view of a loading ramp terminating an automatic conveying system and a vehicle about to be predeterminately positioned with respect to the end of an overhead monorail trackway for a stacker crane.

In FIG. 1 is shown the terminal portion of a loading ramp and a vehicle such as a truck or truck trailer in the act of backing into and being predeterminately located with respect to the terminal portion of a conveyor system 14. Supported above the loading ramp LR is a cantilevered section 15' of an overhead monorail track extending outwardly from the end of the ramp and the final vertical support post 15S for the overhead trackway. The cargo carrier or truck 11 is driven along the ramp approach roadway or ground G with the rear end 12' of the truck or trailer body 12 predeterminately aligned with the end of overhead track section 15' and the rear doors 12" of the truck opened and preferably latched to the side wall of said truck as illustrated. The truck 12 may contain racks or stacks 13 of palletized or otherwise unitized cargo to be unloaded at the terminal defined by the loading ramp LR or the racks 13 of the truck or trailer body 12 may be emptied and adapted to receive containers or palletized loads carried into the body by an automatic conveying apparatus movable along the track 15 to the end 15' thereof. To properly align the trailer or truck body 12 with the overhead monorail trackway 15, a plurality of guides 17 may be disposed along the approach to the ramp LR between which guides the wheels of the truck 11 may be driven by the operator of the truck or marks may be provided on the surface of the approach roadway G to allow the operator of the truck to properly align said tail end with the overhead conveyor 15.

Figures 1, 2:
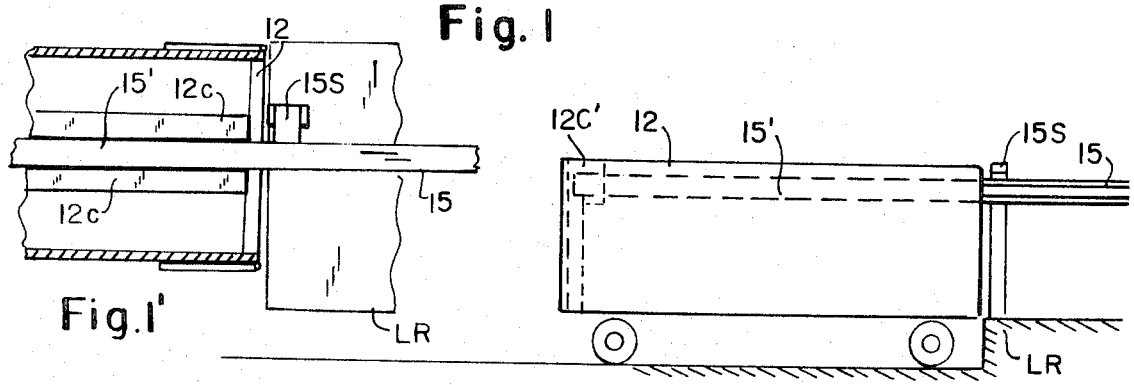
FIG. 2 is a side view of the vehicle of FIG. 1 moved so as to cause the end of the trackway of FIG. 1 to be predeterminately positioned within the vehicle so that one or more carriers or conveyors traveling said trackway may freely move into and out of the vehicle.

From the plan view shown in FIG. 1', it is noted that guides such as box beams or channels 12c are welded to the roof of the truck 12 and spaced apart such that the upper portion of the I-beam shaped track 15 will be predeterminately guided through the vehicle as the vehicle backs towards the loading ramp. Notation 18 refers to a vertical post which may be pivotally mounted near the end of end portion 15' of the track 17 to support said track end during the time the loading ramp terminal is not in use. Said support 18 may be swung upwardly against the under surface of the track end portion 15' so as to dispose it out of the way of said track when a vehicle is driven to insert the end portion of the track into the end of the vehicle as shown in FIGS. 1' and 2. In FIG. 2, the end portion 15' of the trackway 15 is shown fully inserted into the vehicle and is supported at the front end of the vehicle body 12 by means of a box-shaped support 12c' into which the end of 15' slides and is retained when the vehicle body is located as shown in FIG. 2 and the end of the track 15 and the vehicle are predeterminately located below the alignment means 17. Thereafter, a stacker crane 16 may be driven along the track 15' into the vehicle and automatically operated to effect loading and unloading thereof. Other forms of powered and free conveying devices may also be moved along the overhead trackway 15 to end section 15' thereof disposed in the vehicle body to effect the automatic or semi-automatic loading and unloading of loads or articles with respect to the vehicle body per se or racks disposed therein.

In a particular form of the ivnention illustrated in FIGS. 1 and 2, the vehicle 11 may be power winched or otherwise driven along guides or tracks 17 to the loading position illustrated in FIG. 2 and automatically stopped thereat by a remote controller or computer which also controls the operation of the stacker crane 16 thereafter in the act of unloading and loading the vehicle body 12. The vehicle body 12 may also be sideloaded by removing or swinging one or more side wall panels thereof out of the way and locating same at the side of the conveyor track section 17 so that the crane 16 traveling said track section will have access to the rack 13 of the storage vehicle 12. A plurality of vehicles 11 may be disposed aligned end to end adjacent a trackway 15 of an automatic conveying system to permit the performance of preprogrammed loading or unloading operations by means of one or more stacker cranes traveling the conveyor system and having programmed access to selected locations of said vehicles in accordance with the articles or loads held thereby or to be deposited therein.

Figure 3:
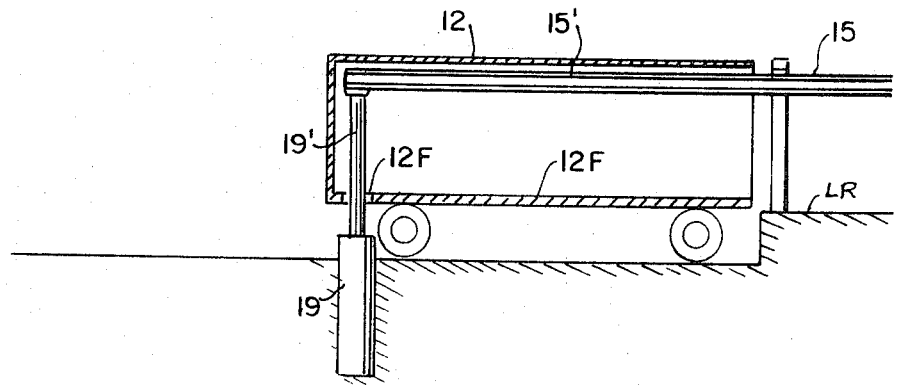
FIG. 3 is a side view of a modified form of the vehicle of FIGS. 1 and 2 wiht the side wall removed showing an auxiliary support means associated with the loading dock inserted through the floor of the vehicle to support the end of the trackway inserted into the vehicle.

FIG. 3 illustrates a modified form of means for supporting the extended portion 15' of the overhead trackway 15 disposed in the vehicle to permit loads to be carried thereby without deflection and without imposing forces on the vehicle body due to the crane operation. The vehicle body storage section 12 is shown predeterminately aligned with the end of the loading ramp LR so that the extended section 15' of the overhead trackway 15 fully projects into the vehicle body as the result of said positioning of said vehicle body. When th end section 15' of the trackway 15 is so disposed, a support therefore is projected upwardly through an opening 12F' in the floor or bottom wall 12F of the vehicle body to engage and support the far end of the trackway section 15' as illustrated. The support comprises a fluid cylinder 19 buried in the roadway or floor G and having an actuator arm 19' which is projectable upwardly as illustrated so as to engage the far end of trackway section 15'. By suitably locking the shaft or actuator arm 19' of the fluid cylinder 19 in its up position, said shaft may be utilized as a support for the extension 15' of the track 15 within the vehicle thereby permitting one or more cranes or other material handling devices to travel along said track into and out of the vehicle in the acts of loading or unloading same. If an automatic control system is utilized to position the vehicle body 12 for loading and unloading as shown in FIGS. 2 and 3 to remove same after these functions have been completed, said system preferably includes an interlock control means controlling the operation of cylinder 19 and the crane 16 traveling the track 15 to prevent (a) movement of the shaft 19 until the vehicle body 12 is properly aligned with the loading ramp, (b) movement of the crane 16 into and out of the vehicle until the attainment of said proper alignment, and (c) movement of the vehicle body 12 away from the ramp until the shaft 19 has been fully retracted to clear the vehicle.

It is to be noted that the principles illustrated in FIGS. 1–3, as well as the other embodiments provided herein, may also be applicable to the automatic or semi-automatic loading and unloading of vehicles other than trucks and truck trailers such as aircraft bodies and freight cars of trains which are modified so as to permit either or both end or side walls thereof to be removed or swung out of the way to permit access thereto of the suitable described conveyor or article transfer apparatus.

Figure 4:
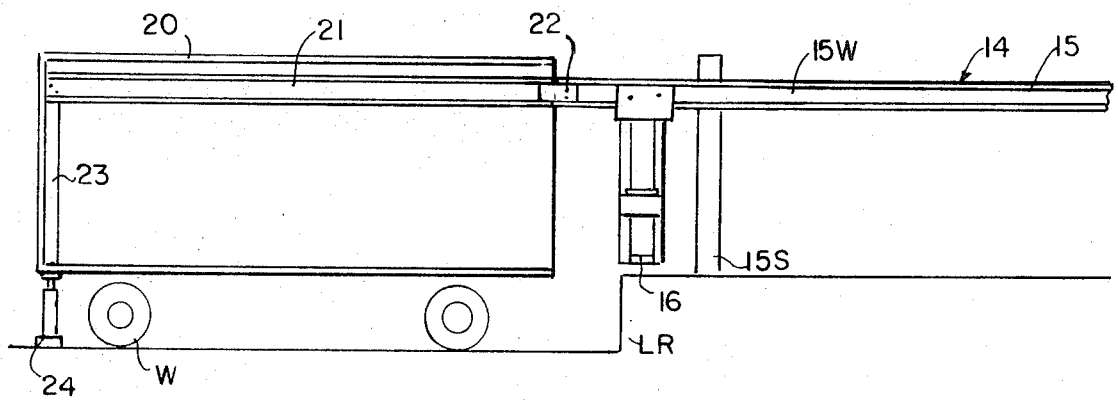
FIG. 4 is a side view of a vehicle with the side wall removed showing the interior thereof which includes a trackway forming part of the vehicle aligned with and coupled to an exterior trackway forming a terminal of an automatic warehousing system.

In FIG. 4 is shown a modified form of the apparatus of FIGS. 1–3 wherein a body 20 such as a vehicle truck, trailer, aircraft or train body contains an overhead track 21 permanently supported therein along or immediately beneath the roof of the body 20 and is operative to receive a cargo handling device such as a stacker crane 16 which may be driven therealong in the act of loading or unloading cargo with respect to racks (not shown) located within said body. The vehicle body 20 is winched or otherwise driven into alignment with the end of a loading ramp LR terminating an automatic conveying system for a warehouse or production line. The end of the overhead trackway 15 of the automatic conveying system 14 is provided with a coupling device 22 which slidably engages with the trackway 21 located within the vehicle 20 when the loading end of the vehicle is moved towards the end of the loading ramp to the position illustrated in FIG. 4. When such coupling is effected, an automatic or manually controlled stacker crane 16 may be power driven into the vehicle for automatically loading or unloading racks (not shown) therein.

Details of the coupling means 23 are shown in FIG. 4'. The coupling means 23 comprises a pair of plates 26a disposed on both sides of the vertical plate or main spar 15a of the I-beam track 15, each of said plates being welded or riveted to the I-beam trackway so as to protrude outwardly from the end 15e thereof and spaced apart a degree such that the vertical plate 21a of the I-beam trackway 21 located in the vehicle may be disposed therebetween. Accordingly, the free ends 23b of the plates 23a perferably are outwardly chamferred or flared to permit insertion of the free end of the trackway 21 therebetween to effect sliding engagement and mechanical coupling between the two I-beams as illustrated.

Notation 15w refers to electrical slide wires extending parallel to and insulatedly supported off the I-beam trackway 15. Wires 15w are insulatedly supported off one of the plates 23a and contain mechanical coupling pin means 23c protruding outwardly from the end of plate 23a at locations to engage respective couplings 21c connected to silde wires 21w and supported by the track 21 of the vehicle 20. Thus, both electrical and mechanical coupling is effected when the vehicle 20 is properly aligned with the end of tracks 15 and moved into engagement with the coupling means 23c thereof.

In FIG. 4, the notation W, as in the other figures of the drawings, refers to the wheels of the vehicle and notation 24 refers to a jack which is brought into operative coupling with the forward end of the vehicle directly beneath a beam 22 supporting the end of track 21 so as to provide support therefore during the loading or unloading operation and to prevent overloading the vehicle frame. Notation 15S refers to the final support post for the track 15 at the end of the loading ramp.

Figure 5:
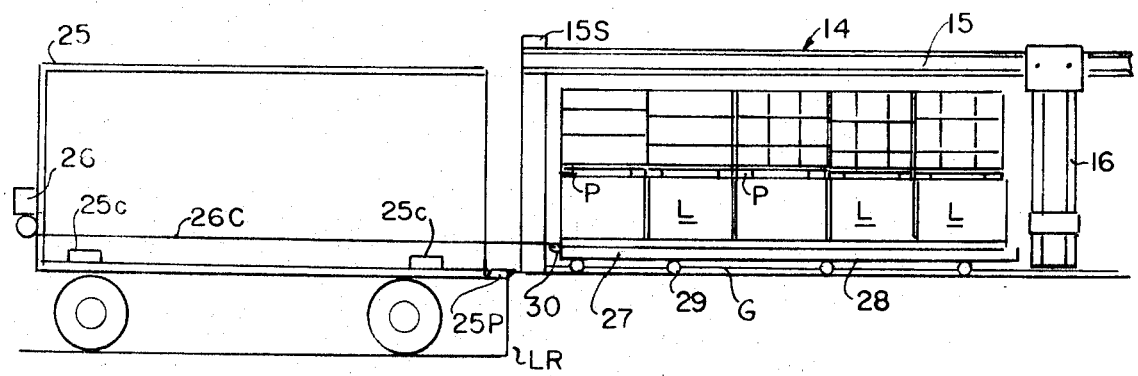
FIG. 5 is a side view of a vehicle located at a loading dock and a skid containing a plurality of palletized loads which are insertable into the end of the vehicle.

In FIG. 5 is shown a loading arrangement for vehicles such as trucks, trailers, aircraft or train bodies wherein the entire vehicle body or a substantial portion thereof may be automatically loaded or unloaded in a single operation. An automatic conveying system 14 is provided together with one or more stacker cranes 16 traveling a monorail track 15 to or near the end of the loading ramp LR and operative to automatically load an unload palletized loads with respect to a movable skid or carrier 27 containing a plurality of said loads to be automatically carried thereby into the vehicle 25. In a perferred form of this embodiment, the skid 27 comprises a low-frame or platform 28 containing rollers 29 and is retained within the body of the vehicle until arrival of said vehicle at a destination whereupon the entire skid and its cargo is removed from the vehicle. As illustrated, the cargo contains a plurality of pallets each having a load L disposed therein. Said loads may be disposed as a single level or a plurality of stacked levels with each load being individually removable from the stacked array thereof on the skid 27 by the automatic operation of stacker crane 16 once the skid has bene predeterminately aligned with said stacker crane or scanning means on the stacker crane 16 automatically locates the skid to permit preprogrammed unloading or loading operations to be effected.

In FIG. 5, a motor operated winch 26 is located at the far end of the vehicle body 25 and is operative to draw a cable 26c into the vehicle body. Coupling of the end of cable 26c with a coupling means such as an eye-bolt 30 at the end of skid 27 which permit the winch to pull the skid and its load into the vehicle. A platform 25p which may comprise the tailgate of the vehicle 25 swings out of the vehicle to the end of the loading ramp LR as illustrated and the floor of the vehicle is substantially at the level of the loading ramp, thereby permitting the wheeled skid 27 to be winched into the vehicle and removed therefrom by proper winching means disposed at the loading or unloading ramp. Once in the vehicle, the skid 27 may be suitably locked or clamped in place to prevent its movement during the operation of the vehicle by a plurality of clamps 25c secured to the floor and/or side wall of the vehicle 25.

Figure 6:
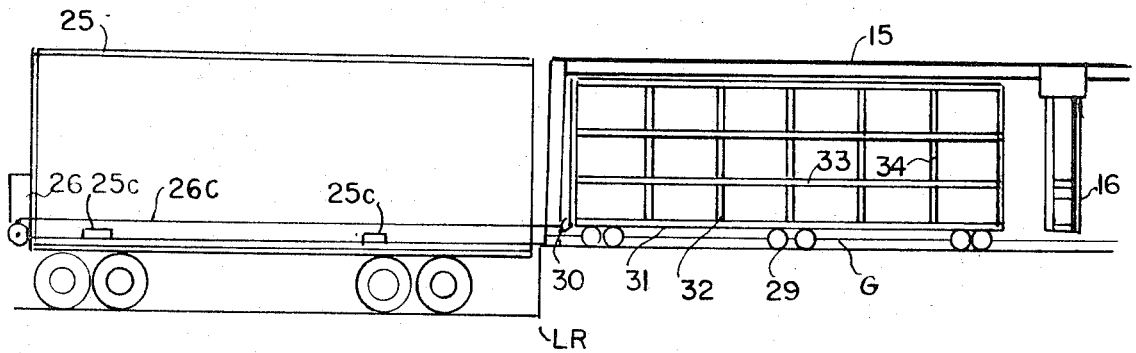
FIG. 6 is a side view of a vehicle and loading dock containing a wheeled rack to be inserted into the vehicle.
Figure 4:
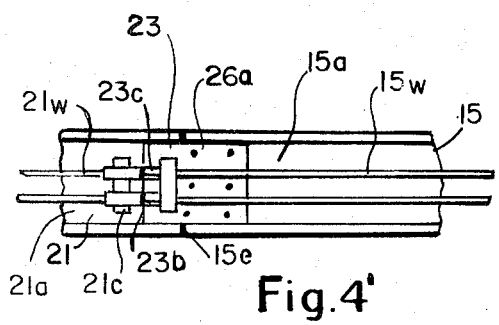

In FIG. 6, the skid of FIG. 5 has been replaced by a wheeled carrier 31 having storage racks 32 permanently affixed thereto. As in FIG. 5, the vehicle 25 contains a winch 26 at the far end thereof for pulling a cable 26c to draw the rack carrier 31 into the vehicle along the floor thereof whereupon it may be clamped or locked in place by suitable clamping means 12c to prevent its movement during the travel of the vehicle to a destination. The shape of the vehicle 31 and its racking 32 may be such that loads carried in said racks will be prevented from lateral shifting by the side walls of the vehicle 25. If this cannot be accomplished, suitable inflatable bladders may be inserted either into the racking or supported by the walls of the vehicle 25 and inflated to retain loads in the racking in position during shipment and to prevent their lateral and longitudinal shifting during the travel of the vehicle. The racks 32 of FIG. 6 may, of course, be replaced by or contain drawers or tote boxes of uniform size and each operative to contain one or more articles or loads during shipment. Inflatable bladder means or packing may be provided in said drawers or tote boxes to prevent shifting of the contents thereof during movement of the vehicle to its destination.

Guideways such as tracks or wheel recesses G in the ramps of FIGS. 5 and 6 may be provi;ed so as to guide the wheeled skid 27 or the rack containing carrier 31 in a path parallel to and adjacent to overhead trackway 15 of the automatic conveying system 14 such that one or more stacker cranes 16 thereof may be operative to automatically transfer loads to and from the skid or carrier prior to its loading into or after its removal from the vehicle 25. The automatic conveying system 14 may also include means for towing or lifting and carrying palletized skids 27 or portable rack containing carriers 31 to and from storage and the loading ramp. The skid 27 and carrier 31 may, in addition to being roller or wheel operated, also be operated by suitable self-propulsion means or a powered vehicle coupleable and uncoupleable therewith.

I claim:

1. A conveying apparatus for servicing cargo carrying vehicles, which vehicles are operative for transporting cargo between distant locations and which apparatus has access to the interiors of said vehicles for transferring cargo relative thereto comprising:
    a loading terminal for cargo and vehicles;
    a conveying system for cargo to be loaded on a vehicle disposed at said loading terminal, said conveying system including:
    a movable first carrier for a plurality of loads capable of being disposed in a stacked array on said first carrier;
    a second carrier comprising load handling means having vertical lift means for stacking individual loads, one above the other, at different locations lengthwise of said first carrier;
    guide means for guiding said second carrier in a predetermined path;
    means for aligning said first carrier adjacent said guide means whereby said second carrier may operate along said guide means and may have access to said first carrier to permit said second carrier to horizontally and vertically dispose individual loads on said first carrier;

a cargo carrying vehicle having an opening thereto through which opening said first carrier may pass into said vehicle when said first carrier is aligned with said opening to permit the insertion of said first carrier into said vehicle and means for power moving and guiding said first carrier loaded into said vehicle when it is aligned with the opening in said vehicle.

2. Conveying apparatus in accordance with claim 1 wherein said second carrier includes an individual self propelled stacker crane and said guide means comprises an overhead trackway extending adjacent at said loading terminal whereby said stacker crane may dispose its loads on said first carrier.

3. A conveying apparatus in accordance with claim 1 wherein said first carrier includes rack means located thereon to receive loads from said second carrier in predetermined stacked arrays and said second carrier comprises a stacker crane operable for loading the rack means of said first carrier.

4. Conveying apparatus in accordance with claim 1 wherein said first carrier is supported on wheels for rolling movement into a vehicle and means for preventing rolling movement of said first carrier within said vehicle.

5. Conveying apparatus in accordance with claim 1 wherein said means for power moving said first carrier loaded into a vehicle comprises a motor operated mechanism supported by the vehicle for driving said first carrier into the vehicle.

* * * * *